(12) United States Patent
Prihoda

(10) Patent No.: US 12,510,267 B2
(45) Date of Patent: Dec. 30, 2025

(54) NOZZLE FOR AIR DUCT

(71) Applicant: PRIHODA S.R.O., Hlinsko (CZ)

(72) Inventor: Zdenek Prihoda, Hlinsko (CZ)

( * ) Notice: Subject to any disclaimer, the term of this patent is extended or adjusted under 35 U.S.C. 154(b) by 457 days.

(21) Appl. No.: 18/267,065

(22) PCT Filed: Dec. 14, 2021

(86) PCT No.: PCT/CZ2021/050150
§ 371 (c)(1),
(2) Date: Jun. 13, 2023

(87) PCT Pub. No.: WO2022/127950
PCT Pub. Date: Jun. 23, 2022

(65) Prior Publication Data
US 2024/0053051 A1 Feb. 15, 2024

(30) Foreign Application Priority Data

Dec. 14, 2020 (CZ) ................................ CZ2020676

(51) Int. Cl.
| | | |
|---|---|---|
| *F24F 13/06* | (2006.01) | |
| *F24F 13/02* | (2006.01) | |
| *F24F 13/065* | (2006.01) | |

(52) U.S. Cl.
CPC .......... *F24F 13/06* (2013.01); *F24F 13/0218* (2013.01); *F24F 13/065* (2013.01)

(58) Field of Classification Search
CPC .... F24F 13/06; F24F 13/0218; F24F 2221/38; F24F 13/065; F24F 13/1426; F24F 13/08; F16L 11/02; F16L 41/007; F16L 41/02; F16L 55/027; F16L 55/09
USPC ......................................................... 454/305
See application file for complete search history.

(56) References Cited

FOREIGN PATENT DOCUMENTS

| | | | | |
|---|---|---|---|---|
| CZ | 22858 U1 | * 11/2011 | .......... | F24F 13/0209 |
| CZ | 2019403 | 8/2020 | | |
| DE | 4024513 | 2/1992 | | |
| DE | 4024513 A1 | * 2/1992 | ............ | F24F 13/065 |
| EP | 2535656 A2 | * 12/2012 | .......... | F24F 13/0209 |
| EP | 2535656 | 10/2017 | | |
| JP | 0791729 | 4/1995 | | |
| JP | 11281137 | 10/1999 | | |
| JP | H11281137 A | * 10/1999 | | |
| JP | 3923170 | 5/2007 | | |

(Continued)

OTHER PUBLICATIONS

Machine Translation of CZ 22858 (Year: 2011).*

*Primary Examiner* — Allen R. B. Schult
*Assistant Examiner* — Amy E Carter
(74) *Attorney, Agent, or Firm* — AdamsIP, LLC

(57) ABSTRACT

A nozzle for an air conditioning vent is disclosed. Specifically, the nozzle is a tube composed of a flexible material to allow the airflow from the nozzle outlet to be adjusted to flow in a desired direction. The nozzle includes an adjustment element to allow a user to adjust and set the output direction of the nozzle. The adjustment element attaches to each end of the nozzle and can be elongated or shortened as needed to achieve the desired output angle. The nozzle can further include reinforcements to help stabilize and maintain the opening throughout the nozzle. Additionally, the nozzle can include an airflow regulator that is configured to achieve a desired cross-sectional area of the nozzle outlet.

11 Claims, 3 Drawing Sheets

(56) References Cited

FOREIGN PATENT DOCUMENTS

SE 515828 10/2001
WO 2020253806 12/2020

* cited by examiner

NOZZLE FOR AIR DUCT

CROSS REFERENCE TO RELATED APPLICATIONS

This application is a National Stage Application of International Application No. PCT/CZ2021/050150, filed Dec. 14, 2020, which claims priority to Czech Patent Application No. PV 2020-676, the contents of which are incorporated by reference in their entirety.

FIELD OF THE INVENTION

The invention relates to a nozzle for an air conditioning duct, wherein the nozzle comprises a tube made of a flexible material, the tube having an inlet end for intake of air from the air duct and an outlet end for exit of air, wherein the inlet end is adapted to be fixed to a wall of the air duct and the nozzle is provided with an adjustment element for setting the direction of the exiting air.

BACKGROUND

Air ducts for air distribution are known in the art. These air ducts can be made of metal or fabric and are provided with openings for passage of air distributed from the duct into its surroundings.

Said openings can be provided with nozzles in order to increase the reach range of the distributed air flow. Some of the known nozzles for air ducts have a rigidly defined shape, and thus also the direction in which the air exits the nozzles. Therefore, they do not enable any change in the direction of the air after the installation of the duct or while in operation.

Furthermore, nozzles with adjustable outlet direction, provided with four spaced-apart sleeves, wherein each one of the sleeves extends from the inlet end of the nozzle to the outlet end, and has a tightening belt inside, the tightening belt being fixed on one side and protruding out of the sleeve on the other side, are known in the art. By sliding the sleeve along the belt, it is possible to adjust the length of the nozzle on one of its sides, thereby bending it to the desired direction. Slow and difficult adjustment of these adjustable nozzles presents a drawback since the sleeves reduce the flexibility of the nozzle.

Furthermore, there are known in the art nozzles with an external adjustment element which can be, with its distal and proximal end, fixed to a loop or an annular reinforcement and the direction of the nozzle can be changed by changing the length of the adjustment element. The adjustment of the length of such a nozzle is easier than in nozzles with longitudinal sleeves, the aim of the invention being to make the adjustment even faster and easier.

SUMMARY

Drawbacks of prior art are eliminated by a nozzle for air ducts, said nozzle comprising
a tube of a flexible material, preferably of fabric or foil, the tube having, at its inlet end, an inlet opening for intake of air from an air duct, and, at its outlet end, an outlet opening for outlet of air, wherein the nozzle is provided, at its external side, with a proximal circumferential annular ring and a distal circumferential annular ring, which are arranged mutually spaced apart,
and an adjustment device for adjusting direction of air exiting the nozzle, wherein the adjustment device comprises an adjustment element,
wherein the adjustment device comprises a pair of fastening elements, each of the fastening elements being attached to the adjustment element and comprising a fastening part, which comprises a saddle part and two arms extending from said saddle part and which is for removable fastening of the fastening element to the circumferential annular ring by inserting the circumferential annular ring between the pair of arms of the fastening part,
wherein the adjustment element has an adjustable length for adjusting and locking the degree of tilting of the outlet opening plane of the nozzle with respect to the inlet opening plane of the nozzle by adjusting the length of the adjustment element between the fastening elements, when one of the fastening elements is mounted with its fastening part to the proximal circumferential annular ring, and the other of the fastening elements is mounted with its fastening part to the distal circumferential annular ring.

Preferably, the fastening part of the fastening element is formed by a C-shaped profile or a J-shaped profile.

Advantageously, the fastening element further comprises an interconnecting part, which is connected to the fastening part.

Preferably, the interconnecting part is connected to the saddle part of the fastening part at the side facing away from the space delimited between the arms of the fastening part.

Preferably, the proximal circumferential annular ring and/or the distal circumferential annular ring has a widened annular region, i.e. a region having a larger cross-section, and a slimmer annular region, i.e. a region having a slimmer cross section, extending in parallel to the widened annular region. At the same time, preferably, the slimmer annular region extends between the widened annular region and a region connecting the circumferential annular ring with the tube, or the slimmer annular region forms a region connecting the circumferential annular ring with the tube.

It is also advantageous, when the proximal circumferential annular ring and/or the distal circumferential annular ring comprises a sleeve, sewn from material of the tube. In that case, preferably, the region of stitching for forming the sleeve forms also a region connecting the sleeve with the nozzle.

Preferably, an annular reinforcement is arranged in the sleeve, preferably, the annular reinforcement is in the form of a string.

The above mentioned drawbacks of prior art are also eliminated by an air duct, the wall of which comprises at least one through opening, wherein, at the external side of the wall, the through opening is adjoined by a proximal region of the nozzle according to any of the preceding claims for directing airflow flowing out through said through opening.

DESCRIPTION OF THE DRAWINGS

These and other features, aspects, and advantages of the present disclosure will become better understood with regard to the following description, appended claims, and accompanying drawings where:

DETAILED DESCRIPTION

Figure 1:
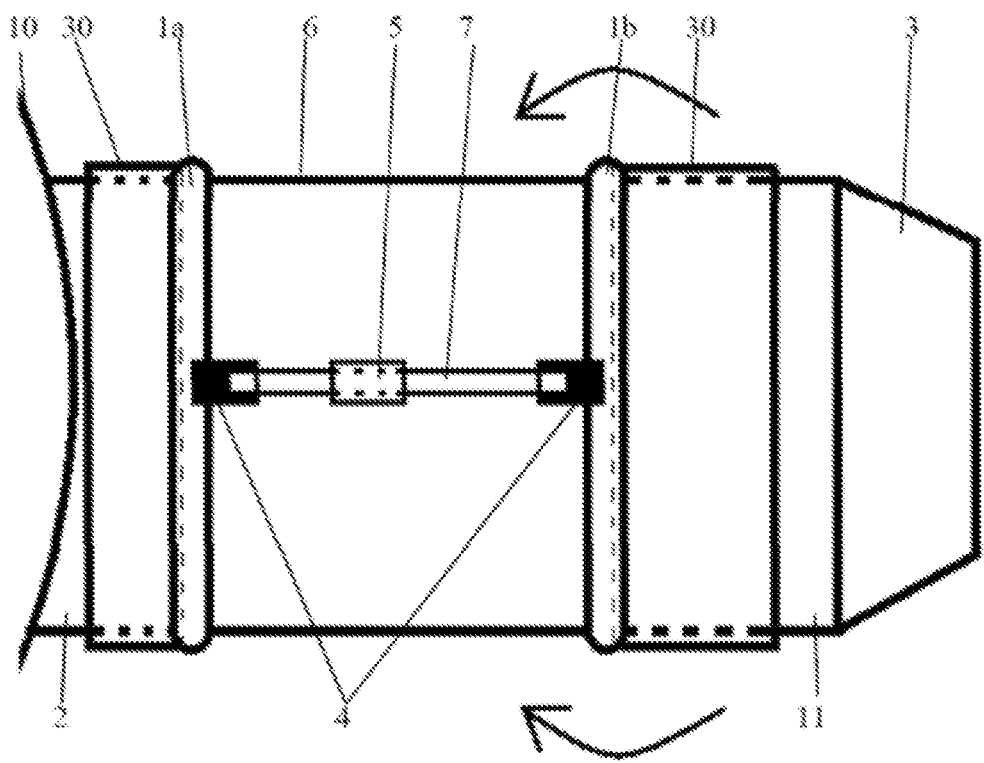
FIG. 1 shows a side view of a nozzle having features consistent with the principles of the present disclosure.

FIG. 1 shows a part of a wall 10 of an air conditioning duct, to which a nozzle of fabric according to the invention is fixed. The nozzle contains a cylindrical tube 6, which has an inlet end 2, with which the nozzle is fixed to the wall 10 of the air duct, such that it forms an extension of an opening in said wall 10, or rather such that the inlet end 2 surrounds the opening. The tube 6 further contains an outlet end 11, to which an end part 3 in the shape of a truncated cone shell is coaxially attached.

The inlet end 2 of the tube 6 is provided on its external side with a proximal circumferential annular ring 1a, wherein the annular ring 1a contains a slimmer annular region 21 and a parallelly extending widened annular region 22, wherein the slimmer annular region 21 forms a region of connection of the circumferential annular ring 1 with the nozzle, or alternatively it can be arranged between the widened annular region 22 and an annular region of attachment of the circumferential annular ring 1 to the nozzle. In the present embodiment, the circumferential annular ring is formed by a sleeve made of the fabric, of which the nozzle is made, and thus it is made by folding the fabric and stitching it and it is reinforced by an annular reinforcement 23, which is arranged in said sleeve.

The annular reinforcement 23 can be in the form of a wire made of metal, plastic or a composite. Preferably, it is made of a string, such as a silicon string. In another embodiment (not shown), the annular reinforcement 23 is omitted, while the sleeve is reinforced by folding the material from which it is made, such that the sleeve itself constitutes a reinforced proximal circumferential annular ring 1a, or possibly a widened annular region 22.

The proximal circumferential annular ring 1a is arranged in the vicinity of the inlet end 2 of the tube 6, the nozzle being further provided with a distal circumferential annular ring 1b, which is spaced apart from the proximal circumferential annular ring 1a and arranged farther from the inlet end 2 of the tube 6, wherein the design of the distal circumferential annular ring 1b can be made such that it corresponds to the design of the proximal circumferential ring 1a in any of the above described embodiments.

The air duct can be made of metal, preferably of fabric. The nozzle can be made of any flexible material, preferably made of fabric, most preferably made of the same material as the wall 10 of the air duct.

The end part 3 is coaxially attached to the outlet end 11 of the tube 6, wherein the area of the cross-section of the end part 3 decreases as the distance from the outlet end 11 increases.

The invention further includes an adjustment device containing an adjustment element 7 and a pair of fastening elements 4, which are fastenable to said circumferential annular rings 1a, 1b.

The adjustment element 7 has a form of a belt or a string provided with a locking device, the locking device being e.g. in the form of a buckle 5, a fastener or a cord stopper. The buckle 5 can be provided with a corresponding opening, through which the adjustment element 7 can be pulled. The buckle 5 can be e.g. a plastic or a metal buckle with a fastener.

Alternatively, the locking device forms a part of one of the fastening elements 4, namely its interconnecting part 4b. For example, a buckle can be an integral part of the interconnecting part 4b.

The fastening element 4 is made of plastic, or possibly of metal or composite, and preferably it is produced by injection of plastic into mould, wherein it contains a fastening part 4a, preferably C-shaped and fastenable to the circumferential annular ring 1a, 1b by putting said part on the circumferential annular ring, and an interconnecting part 4b, arranged at the other side opposite than the internal space of the fastening part 4a (or rather of the C-profile), the interconnecting part 4b containing a through opening 8, through which the adjustment element 7 extends.

The shape of the internal surface of the fastening part 4a of the fastening element 4 is preferably complementary to the shape of the external surface of the circumferential annular ring 1a, 1b, thus preferably being cylindrical. Generally speaking, the fastening part 4a may contain a saddle part, from which an arm extends on both sides, the arms preferably extending symmetrically so that the saddle part and the arms together delimit a channel, the channel being open in both axial directions and along the entire length in one lateral direction, namely e.g. in the direction opposite to the saddle part, wherein the width of the lateral open region, ergo the distance between the distal ends of the arms, is identical or larger than the width of the slimmer annular region 21 of the circumferential annular ring 1a, 1b but smaller than the width of the widened annular region 22 of the circumferential annular ring 1a, 1b.

The maximum mutual distance of the arms of the fastening part 4a, i.e. the distance in the widest region of the space delimited by the arms, is bigger that mutual distance of the distal ends of the arms. The fastening part 4a of the fastening element may be preferably flexible so that, while putting the fastening element 4 on the circumferential annular ring 1a, 1b (or while removing said element), the arms of the fastening part 4a can be temporarily drawn away from each other, thereby enabling the arms to be moved over the widened part 22 of the circumferential annular ring 1a, 1b.

Instead of extending through the through opening 8 in the interconnecting part 4b, the adjustment element 7 can be firmly attached to the fastening element 4, namely to the interconnecting part 4b, or possibly the connecting element 4 can be made up exclusively of the fastening part 4a, to which the adjustment element 7 is attached in the region of the saddle part of the C-profile.

The default setting of the length of the adjustment element 7 is such that the axis of the end part 3 (or rather of the outlet end) and the axis of the inlet opening at the inlet end 2 of the tube 6 are identical, so that the exiting air flows essentially in the direction perpendicular to the wall 10 of the air duct. When the length of the adjustment element 7 is shortened, the axis of the end part 3 is inclined with respect to the axis of the inlet opening at the inlet end 2. As a maximum value of the deviation between the axes, 30° is recommendable. To this end, the adjustment device can be formed so that the minimum possible length of the adjustment element 7 corresponds to a 30° deviation of said axes.

In other words, setting of the direction of the air exiting the nozzle is carried out by adjusting inclination of the plane, in which the circumferential annular ring at the outlet end 11 of the tube 6 is arranged, with respect to the plane, in which the circumferential annular ring at the inlet end 2 of the nozzle is arranged. This adjusting is carried out in the following way: on the side of the nozzle to which the nozzle is to be bent, a fastening element 4 is mounted with its fastening part 4a on the proximal circumferential annular ring 1a at the inlet end 2 of the tube 6, thereby fastening said element to said annular ring, and the other fastening element 4 is mounted on the distal circumferential annular ring 11b, thereby fastening the said element to said ring. Subsequently, the length of the adjustment element 7 between the fastened fastening elements 4 is adjusted and locked, thereby fixing their mutual distance and consequentially also the inclination of the outlet end of the tube 6 with respect to the inlet end of the tube 6. The length of the adjustment element 7 is locked with a buckle or a stopper.

Whenever it is needed to change the direction of the air exiting the nozzle, it is possible to slide one or both of the fastening elements 4 along the circumferential annular ring and/or change and lock the length of the adjustment element 7.

The annular reinforcements 23 are removably arranged in the sleeves or are permanently sewn in them and are fully covered by the fabric of the sleeves.

Figure 2:
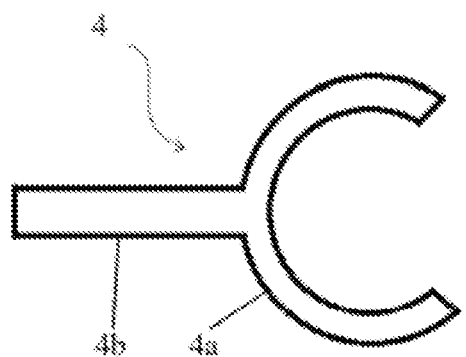
FIG. 2 shows an enlarged side view of a fastening element consistent with the principles of the present disclosure.
Figure 3:
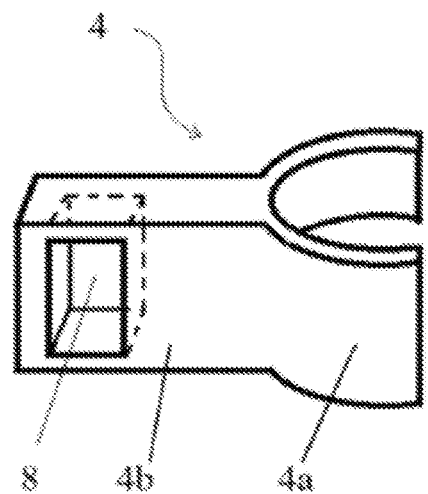
FIG. 3 shows a perspective view of a fastening element consistent with the principles of the present disclosure.
Figure 4:
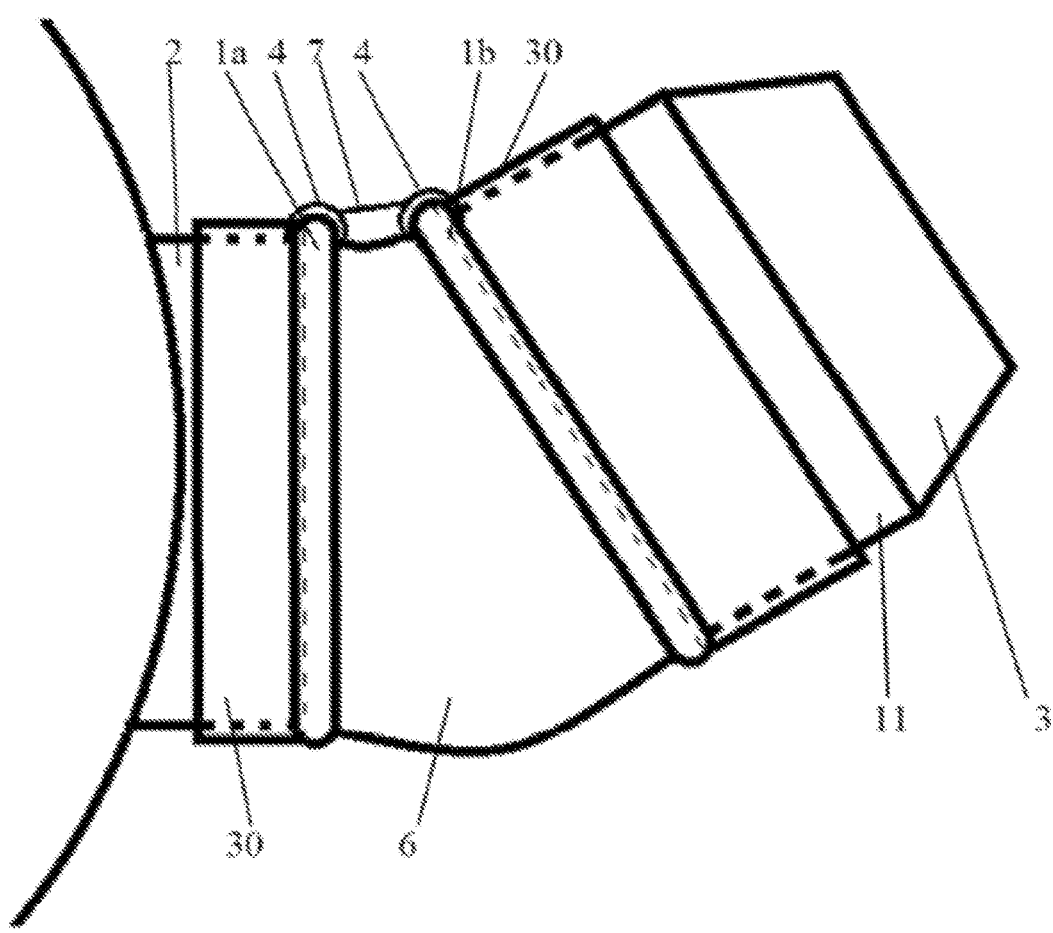
FIG. 4 shows a side view of a nozzle in a directed state consistent with the principles of the present disclosure.
Figure 5:
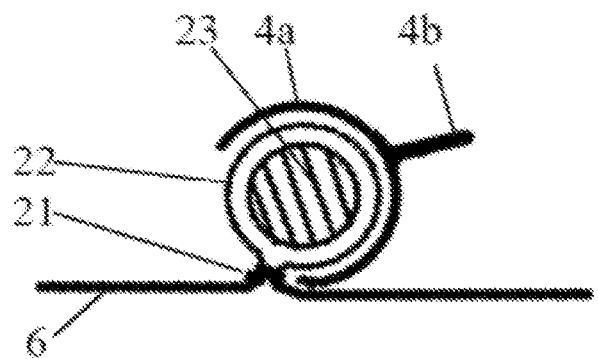
FIG. 5 shows a cross-sectional view of an annular ring with the fastening element fastened consistent with the principles of the present disclosure.

The circumferential annular rings 1a, 1b can be further covered by covering cuffs 30. These covering cuffs 30 are preferably made of the same material as the tube 6 and are fixed to the inlet end 2 and to the outlet end 11, respectively, wherein each one of the cuffs can be tilted to the operational position, in which it covers at least the circumferential annular ring 1a, 1b, and tilted back to the assembly position (as depicted in FIGS. 1 and 2), in which the circumferential annular ring 1a, 1b is made accessible and manipulation with the fastening elements 4 is enabled.

The nozzle may contain the tube 6 and the end part 3, as depicted in Figures, wherein the tube 6 has an essentially constant cross-section along its entire length, while the end part 3 has a continually tapering cross-section. Alternatively, the tube 6 can be also continually tapering, in which case the end part 3 can be, but does not need to be present. The cross-section of the tube 6 and/or the end part 3 is preferably circular but it can have other shapes, e.g. quadratic, rectangular or oval.

Figure 6:
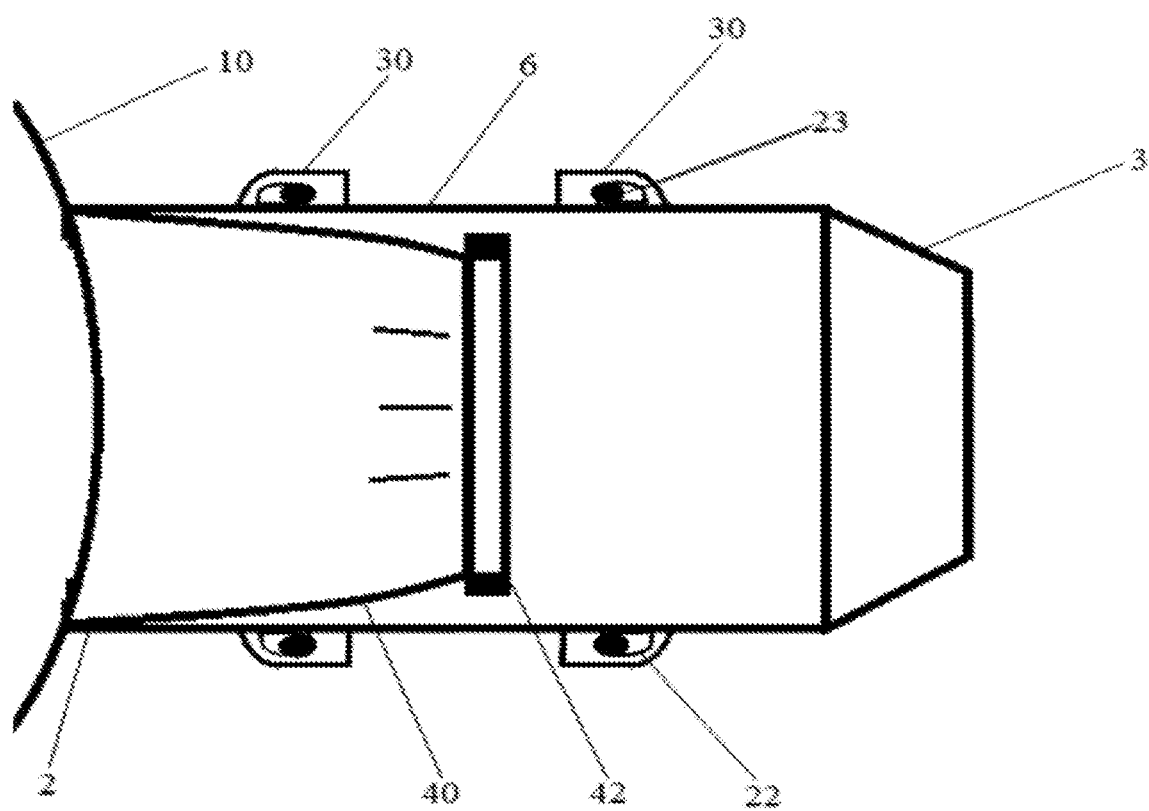
FIG. 6 shows a cross-sectional view of an embodiment of a nozzle with an inserted regulator consistent with the principles of the present disclosure.

Furthermore, a regulator 40, which regulates the amount of the exiting air, can be arranged inside the nozzle, said regulator having a tubular shape and with its inlet end being coaxially fixed in the nozzle, wherein its outlet end is provided with a tightening mechanism 42, e.g. in the form of a tightening string or a tightening belt, with which the cross-section of the outlet end of the regulator 40 can be adjusted and locked, thereby adjusting and locking the amount of the air, exiting the nozzle in operation, as well. The tightening belt or string can be arranged circumferentially, as depicted in FIG. 6, and it can be fastened by means of loops or sleeve/sleeves such that it enables draping of the material of the regulator 40 along its outlet end, thereby reducing the cross-section of the outlet circumference. The regulator 40, which regulates the amount of the outlet air, is preferably also made of fabric, or possibly of foil, and is sewn into, or rather sewn to the internal wall of the nozzle.

The nozzles according to the invention are especially suitable for use in fabric air ducts but they can be also used for air ducts of metal.

It is clear that a person skilled in the art would readily find further possible alternatives to the embodiments described herein. The scope of the protection is therefore not limited to these exemplifying embodiments but it is rather defined by the appended claims.

The invention claimed is:

1. A nozzle for air ducts, said nozzle comprising
a tube made of fabric or foil, the tube having, at an inlet end, an inlet opening for intake of air from an air duct, and, at an outlet end, an outlet opening for outlet of air, wherein the nozzle is provided with a proximal circumferential annular ring and a distal circumferential annular ring which are spaced apart and arranged on an external side of the nozzle,
and an adjustment device for adjusting a direction of air exiting the nozzle, wherein the adjustment device comprises an adjustment element, a pair of fastening elements,
wherein each of the fastening elements are attached to the adjustment element and comprise a fastening part, which comprises a saddle part and two arms extending from said saddle part and wherein the fastening part is configured to removably mount the fastening element to the circumferential annular ring by inserting the circumferential annular ring between the pair of arms of the fastening part,
wherein the adjustment element has an adjustable length for adjusting and locking a degree of tilt of the outlet opening of the nozzle with respect to the inlet opening of the nozzle by adjusting the length of the adjustment element between the fastening elements, when one of the fastening elements is mounted to the proximal circumferential annular ring, and the other of the fastening elements is mounted to the distal circumferential annular ring.

2. The nozzle according to claim 1, wherein the fastening part of the fastening element is formed by a C-shaped profile or a J-shaped profile.

3. The nozzle according to claim 1, wherein the fastening element further comprises an interconnecting part, which is connected to the fastening part.

4. The nozzle according to claim 3, wherein the interconnecting part is connected to the saddle part of the fastening part on a side facing away from a space between the arms of the fastening part.

5. The nozzle according to claim 1, wherein the proximal circumferential annular ring and/or the distal circumferential annular ring has a widened annular region and a slimmer annular region, wherein the slimmer annular region extends parallel to the widened annular region.

6. The nozzle according to claim 5, wherein the slimmer annular region extends between the widened annular region and a region connecting the circumferential annular ring with the tube.

7. The nozzle according to claim 5, wherein the slimmer annular region forms a region connecting the circumferential annular ring with the tube.

8. The nozzle according to claim 1, wherein the proximal circumferential annular ring and/or the distal circumferential annular ring comprises a sleeve, sewn from material of the tube.

9. The nozzle according to claim 8, wherein an annular reinforcement is arranged in the sleeve.

10. The nozzle according to claim 9, wherein the annular reinforcement is in the form of a string.

11. The nozzle according to claim 1, wherein an airflow regulator is coaxially arranged within the nozzle, the regulator having a tubular shape and, at the outlet end, being provided with a tightening mechanism for regulating the size of the cross-section of the outlet end of the regulator.

* * * * *